(No Model.)
A. B. JOHNSON.
PLATFORM SPRING FOR VEHICLES.
No. 330,405. Patented Nov. 17, 1885.
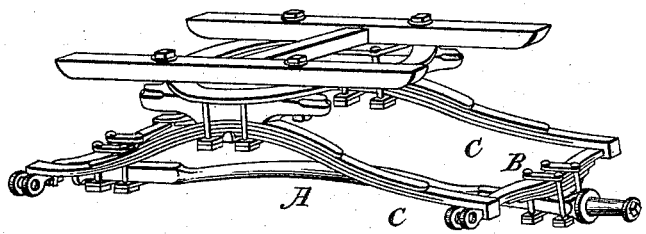
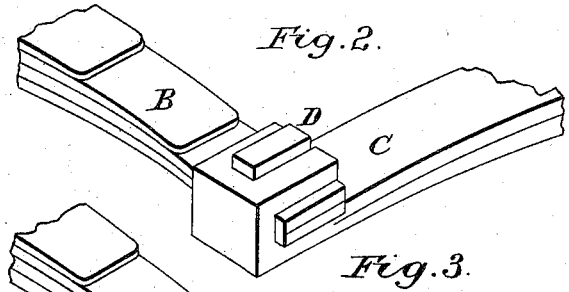
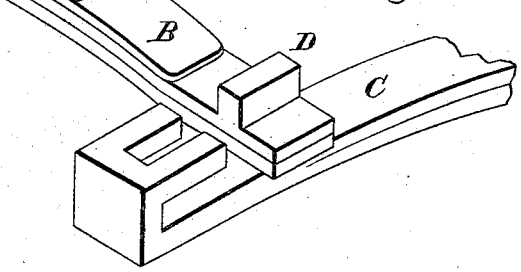
Witnesses:
Arthur B. Moore,
Addie S. Adams.
Inventor.
Andy B. Johnson

UNITED STATES PATENT OFFICE.

ANDY B. JOHNSON, OF DECATUR, MICHIGAN.

PLATFORM-SPRING FOR VEHICLES.

SPECIFICATION forming part of Letters Patent No. 330,405, dated November 17, 1885.

Application filed September 19, 1884. Serial No. 143,473. (No model.)

*To all whom it may concern:*

Be it known that I, ANDY B. JOHNSON, a citizen of the United States, residing at Decatur, in the county of Van Buren and State of Michigan, have invented a new and useful Improvement in Wagon-Gears, of which the following is a specification.

My invention relates to the construction of platform-springs for wagons, in which I employ two semi-elliptic side springs placed on the axle near the hub of the wheel, and at right angles to the axle, and two semi-elliptic cross-springs parallel with the axle in the front gear, and the same in the rear gear. One of the principal objects sought for is to avoid the use of any shackles when the springs are attached together, as shackles soon become worn and rattle, and do not then keep the springs in proper position. This manner of construction, especially in the springs where four semi-elliptic springs are attached to each front and rear axle, combines a very strong and valuable combination in a wagon-gear, which is light and all simple and very durable.

Figure 1 represents a perspective view of the front gear; Fig. 2, a bottom view of a section of the side and cross springs, which shows their connection; Fig. 3, the ends of a side and cross spring to show their formation.

Similar letters refer to similar parts throughout the several views.

A designates the axle, to which is attached the side spring, B, at right angles to the axle, and C is the cross-spring, to which is attached the fifth-wheel, head-blocks, &c., in the middle, and rests on the top of the side spring, B, at the ends, secured there by my peculiar turning of the end of the cross-spring C around the side spring, B, and provided with a slot, which allows the raised piece D, on the bottom of side spring, B, to work into the said slot. This enables the cross-spring C to lengthen when the weight of the load comes upon it, and the raised piece D on the side spring, B, prevents the cross-spring C from moving sidewise.

I am aware that prior to this application wagon-gears have been made with two springs, in each front and rear gear parallel with the axle, but no side springs, and the springs attached in a different manner; therefore I do not claim the whole as broadly new; but What I do claim as new and original, and desire to secure by Letters Patent, is—

The raised piece D on side spring, B, working in connection with the slotted end of cross-spring C, which is bent around side spring, B, all for the purpose described.

ANDY B. JOHNSON.

Witnesses:
ARTHUR L. MOULTON,
ORANGE BEACH.